US 8,823,966 B2

(12) United States Patent
Lee et al.

(10) Patent No.: US 8,823,966 B2
(45) Date of Patent: Sep. 2, 2014

(54) IMAGE FORMING APPARATUS AND SYSTEM AND METHOD FOR CHARGING FOR PRINTING

(75) Inventors: Lye-suk Lee, Suwon-si (KR); Hwan-joon Choi, Suwon-si (KR); Ji-young Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 838 days.

(21) Appl. No.: 12/923,670

(22) Filed: Oct. 1, 2010

(65) Prior Publication Data

US 2011/0164270 A1 Jul. 7, 2011

(30) Foreign Application Priority Data

Jan. 6, 2010 (KR) .............................. 2010-0000888

(51) Int. Cl.
*G06K 15/00* (2006.01)
*G06K 15/02* (2006.01)
*G06F 3/12* (2006.01)
*H04N 1/00* (2006.01)

(52) U.S. Cl.
USPC ........ 358/1.14; 358/1.15; 358/1.16; 358/501; 358/401

(58) Field of Classification Search
None
See application file for complete search history.

(56) References Cited

U.S. PATENT DOCUMENTS

| | | | | |
|---|---|---|---|---|
| 5,610,688 A | * | 3/1997 | Inamoto et al. | ............... 399/366 |
| 6,674,545 B1 | * | 1/2004 | Atsumi | .......................... 358/1.9 |
| 7,593,123 B2 | * | 9/2009 | Sugahara | ...................... 358/1.14 |
| 2002/0030840 A1 | * | 3/2002 | Itaki et al. | ..................... 358/1.13 |
| 2006/0126115 A1 | * | 6/2006 | Morikawa et al. | ........... 358/1.15 |
| 2007/0162480 A1 | | 7/2007 | Garg et al. | |
| 2008/0055642 A1 | * | 3/2008 | Nakamura | .................... 358/1.15 |
| 2008/0094657 A1 | | 4/2008 | Ikegami et al. | |
| 2008/0137134 A1 | * | 6/2008 | Igarashi | ....................... 358/1.15 |
| 2010/0332823 A1 | * | 12/2010 | Tsujimoto | ..................... 713/155 |

FOREIGN PATENT DOCUMENTS

| | | | |
|---|---|---|---|
| JP | 2003-150336 | 5/2003 | |
| JP | 2006-116744 A | * 5/2006 | .............. B41J 29/38 |
| JP | 2009-25859 | 2/2009 | |
| KR | 10-2005-0044299 | 5/2005 | |
| KR | 10-2008-0091678 | 10/2008 | |

OTHER PUBLICATIONS

Extended European Search Report for European Application No. 10196336.1, mailed Feb. 4, 2013.

* cited by examiner

*Primary Examiner* — King Poon
*Assistant Examiner* — Beniyam Menberu
(74) *Attorney, Agent, or Firm* — Staas & Halsey LLP

(57) ABSTRACT

An image forming apparatus is provided. The image forming apparatus includes a storage unit which stores information regarding the other image forming apparatuses of the same group as the image forming apparatus and quota information of each user which is shared by the other image forming apparatuses, a controller which, if a job command is input, determines whether to perform a job according to whether the number of copies requested by the job command satisfies the quota information of each user, a function unit which performs the job under control of the controller, a quota information administration unit which updates the quota information of each user stored in the storage unit as the job is performed, and a communication interface which transmits the updated quota information of each user to the other image forming apparatuses.

17 Claims, 10 Drawing Sheets

| | USERS | Quota |
|---|---|---|
|  | USER 1 | PRINT:10, COPY:10, FAX:10, SCAN:10 |
|  | USER 2 | PRINT:20, COPY:20, FAX:20, SCAN:20 |
|  | USER 3 | PRINT:15, COPY:15, FAX:15, SCAN:15 |

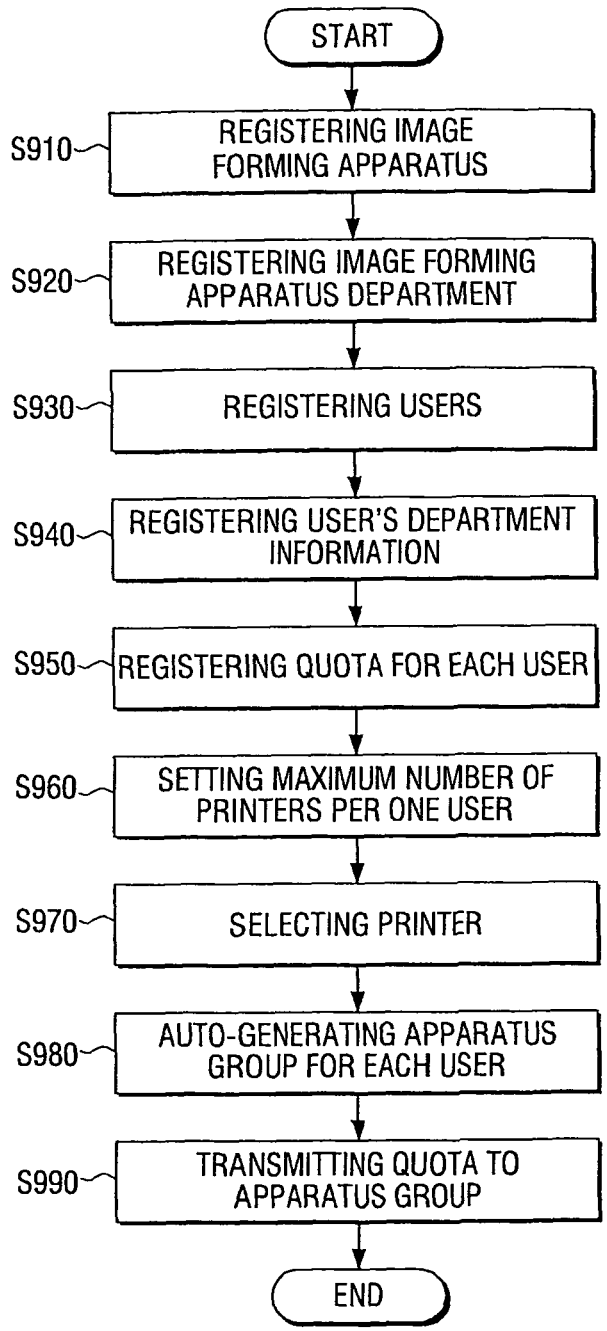

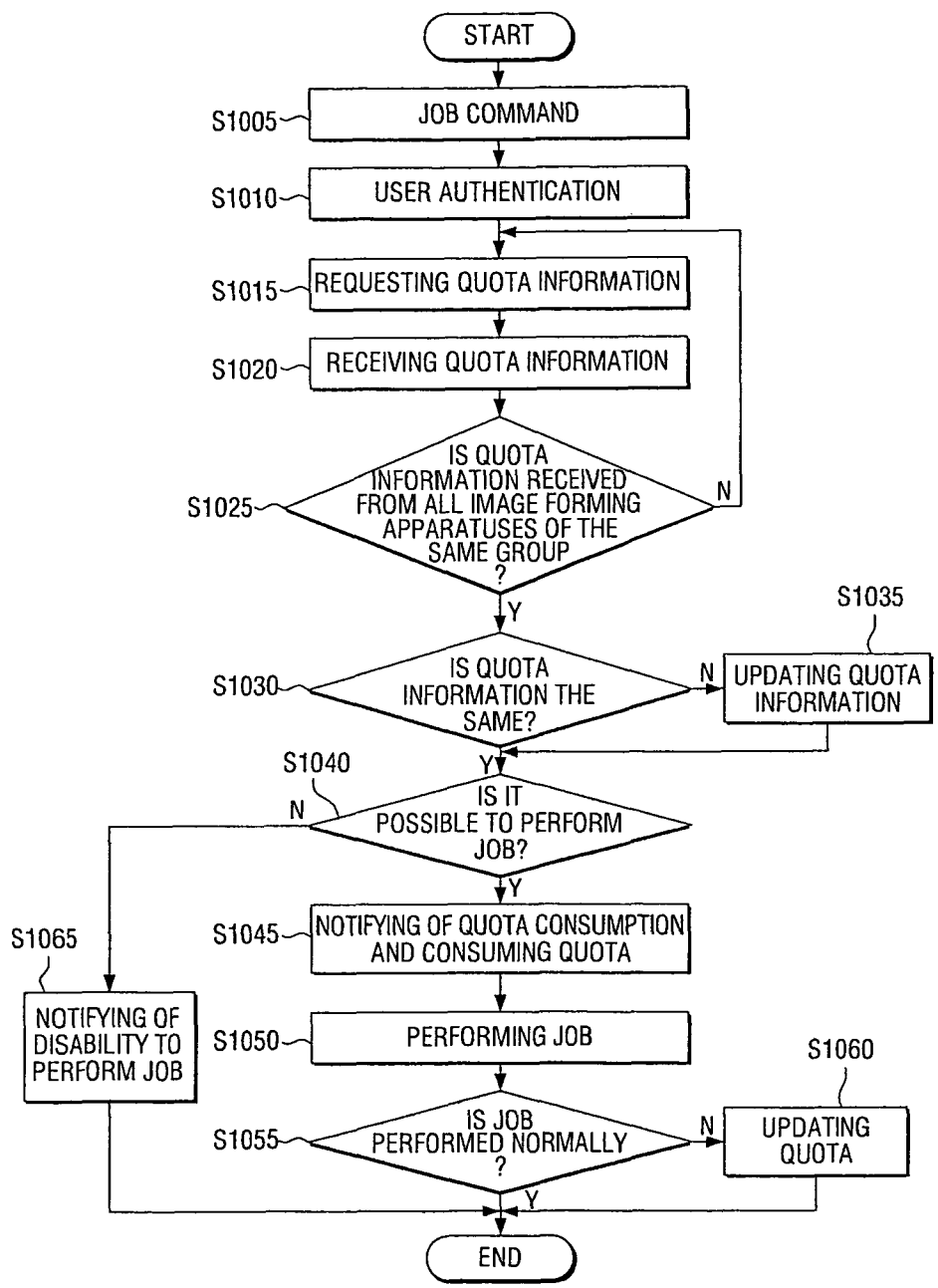

IMAGE FORMING APPARATUS AND SYSTEM AND METHOD FOR CHARGING FOR PRINTING

CROSS-REFERENCE TO RELATED APPLICATION

This application claims priority benefit from Korean Patent Application No. 10-2010-00888, filed on Jan. 6, 2010, in the Korean Intellectual Property Office, the disclosure of which is incorporated herein by reference in its entirety.

BACKGROUND

1. Field

Embodiments relate to an image forming apparatus, a printing charging system, and a method for charging for printing, and more particularly, to an image forming apparatus, a printing charging system, and a method for charging for printing, which group a plurality of image forming apparatuses and allow them to share quota information.

2. Description of the Related Art

As used herein, an image forming apparatus is an apparatus that renders printing data generated by a terminal device such as a computer and tangibly produces the rendered printing data on a recording medium. Examples of such an image forming apparatus include copiers, printers, facsimile machines, and multi-function peripherals (MFP) incorporating the functions of the aforementioned devices into a single device.

Recently, public offices, universities, or enterprises use an administration server to control several image forming apparatuses easily. Such an administration server provides a job accounting operation for each individual.

However, according to a related-art job accounting method, an administration server owns quota information of users, and an image forming apparatus should request the administration server to transmit the quota information or receive a confirmation as to whether a printing process is being in progress or not from the administration server every time that the image forming apparatus performs a job. Therefore, as the number of image forming apparatuses connected to the administration server increases, a traffic problem between the image forming apparatus and the administration server becomes more serious.

Also, in the case that the image forming apparatus stores therein quota information and performs job accounting, a user has no choice but to perform a printing job using an image forming apparatus in which his or her own quota information is stored. Therefore, there is a need for a job accounting method, which can reduce traffic load between an administration server and an image forming apparatus and which can perform a printing job using a plurality of image forming apparatuses more easily.

SUMMARY

Embodiments may overcome at least one of the above disadvantages and may overcome other disadvantages not described above.

Embodiments provide an image forming apparatus, a printing charging system and a method for charging for printing, which can allow quota information to be shared among grouped image forming apparatuses.

According to an aspect of an embodiment, there is provided an image forming apparatus including: a storage unit which stores information regarding (about) the other image forming apparatuses of the same group as the image forming apparatus and quota information of each user which is shared by the other image forming apparatuses, a controller which, if a job command is input, determines whether to perform a job according to whether the number of copies requested by the job command satisfies the quota information of each user, a function unit which performs the job under control of the controller; a quota information administration unit which updates the quota information of each user stored in the storage unit as the job is performed; and a communication interface which transmits the updated quota information of each user to the other image forming apparatuses.

If the job command is input, the communication interface may request the other image forming apparatuses to transmit quota information of a user who has input the job command, and receive the quota information.

The quota information administration unit may compare the received quota information of the user with the quota information of each user stored in the storage unit, thereby updating or maintaining the quota information of each user.

The controller may determine whether to perform the job if quota information is received from all other image forming apparatuses of the same group.

The image forming apparatus may further include an authentication unit which performs authentication with respect to the job command, and the controller may determine whether to perform the job regarding (about) only a job command which is authenticated.

The storage unit may receive the information regarding (about) the other image forming apparatuses of the same group as the image forming apparatus and the quota information of each user which is shared with the other image forming apparatuses, from an administration server connected to the image forming apparatus, and store the information, and the communication interface may transmit the updated quota information of each user to the administration server at a predetermined time.

The image forming apparatus may further include user interface which displays a message indicating that the job cannot be performed if the number of copies requested by the job command does not satisfy the quota information of each user.

The communication interface may repeatedly transmit the updated quota information of each user to an image forming apparatus which has not received the updated quota information of each user.

According to an aspect of another embodiment, there is provided a printing charging system, including: a plurality of image forming apparatuses, and an administration server which classifies the plurality of image forming apparatuses into at least one image forming apparatus group, and generates quota information of each user for each image forming apparatus group, wherein each of the image forming apparatuses receives information regarding (about) the other image forming apparatuses of the same group and the generated quota information of each user from the administration server, shares the received quota information with the other image forming apparatuses of the same group, and performs a job according to the shared quota information.

Each of the image forming apparatuses may include a storage unit which stores the received quota information regarding (about) the other image forming apparatuses of the same group and the received quota information of each user, a communication interface which requests the other image forming apparatuses to transmit quota information of each user and receives the quota information of each user, and a quota information administration unit which compares the quota information received from the other image forming apparatuses with the quota information of each user stored in the storage unit, thereby updating or maintaining the quota information of each user.

Each of the image forming apparatuses may further include a controller which, if a job command is input, determines whether to perform a job according to whether the number of copies requested by the job command satisfies the quota information of each user, and a function unit which performs the job under control of the controller.

The quota information administration unit may update the quota information of each user stored in the storage unit as the job is performed, and control the communication interface to transmit the updated quota information of each user to the other image forming apparatuses.

According to an aspect of still another embodiment, there is provided a method for charging for printing of an image forming apparatus, the method including: receiving a job command, determining whether to perform a job according to whether the number of copies requested by the job command satisfies quota information of each user which is pre-stored in the image forming apparatus, performing the job if the requested number of copies satisfies the quota information of each user, updating the quota information of each user as the job is performed, and transmitting the updated quota information of each user to the other image forming apparatuses.

The method may further include, if the job command is input, requesting the other image forming apparatuses to transmit quota information regarding (about) a user who has input the job command and receiving the quota information.

The method may further include comparing the received quota information of the user with the quota information of each user stored in the storage unit, thereby updating the quota information of each user.

The determining whether to perform the job may be performed if quota information is received from all other image forming apparatuses of the same group.

The method may further include performing authentication with respect to the job command, and the determining whether to perform the job may be performed with respect to only a job command which is authenticated.

The method may further include: receiving information regarding (about) the other image forming apparatuses of the same group as the image forming apparatus and quota information of each user which is shared with the other image forming apparatuses, from an administration server connected to the image forming apparatus, pre-storing the received quota information regarding (about) the other image forming apparatuses and the quota information of each user, and transmitting the updated quota information of each user to the administration server at a predetermined time.

The method may further include informing that the job cannot be performed if the number of copies requested by the job command does not satisfy the quota information of each user.

The transmitting the updated quota information of each user may repeatedly transmit the updated quota information of each user to an image forming apparatus which has not received the updated quota information of each user.

BRIEF DESCRIPTION OF THE DRAWINGS

The above and/or other aspects of embodiments will become more apparent and more readily appreciated by describing in detail embodiments in the following description, with reference to the accompanying drawings in which:

FIG. 9 is a flowchart illustrating a method for generating quota information of each user by an administration server according to an embodiment; and FIG. 10 is a flowchart illustrating a method for charging for printing by an image forming apparatus according to an embodiment.

DETAILED DESCRIPTION

Figure 1:
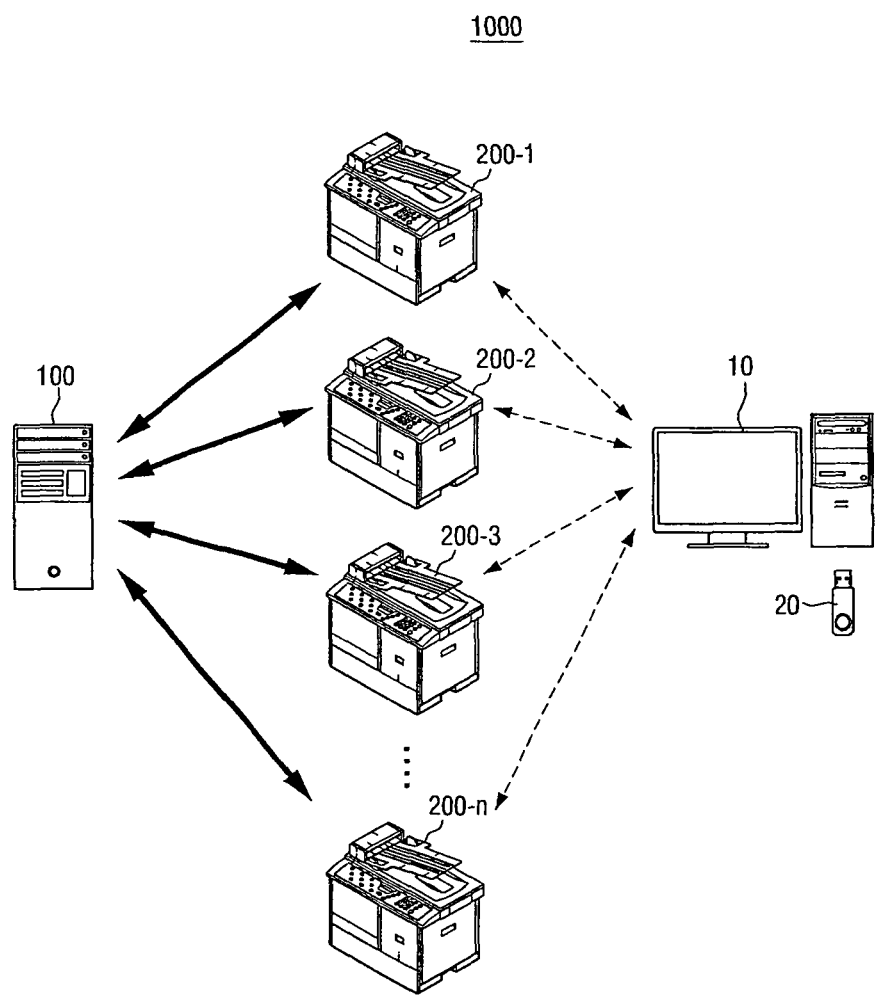
FIG. 1 is a block diagram illustrating a printing charging system according to an embodiment.

Hereinafter, embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of embodiments.

FIG. 1 is a block diagram illustrating a printing charging system 1000 according to an embodiment.

Referring to FIG. 1, the printing charging system 1000 includes an administration server 100 and a plurality of image forming apparatuses 200-1, 200-2, 200-3, . . . , 200-n.

The administration server 100 classifies the plurality of image forming apparatuses 200-1, 200-2, 200-3, . . . 200-n into at least one image forming apparatus group, and generates quota information of each user for each image forming apparatus group. The configuration and operation of the administration server 100 will be described in detail below with reference to FIG. 2.

The plurality of image forming apparatuses 200-1, 200-2, 200-3, . . . , 200-n are connected to the administration server 100, and receive "information regarding the other image forming apparatuses of the same group" and "generated quota information of each user" from the administration server 100, share the received quota information with the other image forming apparatuses of the same group, and perform a job requested by a user according to the shared quota information.

In FIG. 1, four (4) image forming apparatuses 200-1, 200-2, 200-3, . . . , 200-n are directly connected to the administration server 100. However, four or more image forming apparatuses may be connected to the administration server 100 and also may be connected to it indirectly, such as via a router or another administration server.

Figure 2:
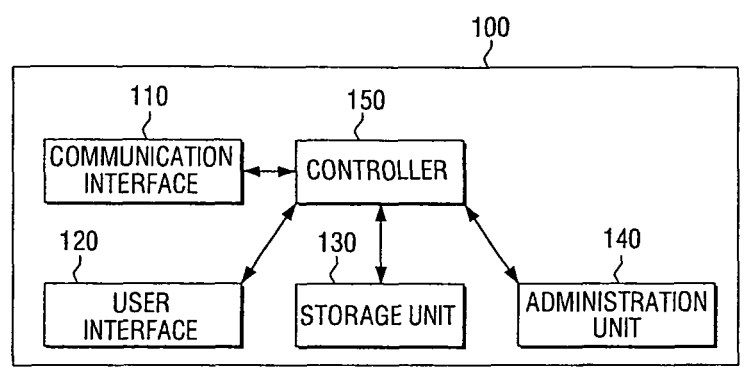
FIG. 2 is a block diagram illustrating the administration server of FIG. 1.

FIG. 2 is a block diagram illustrating the administration server 100 of FIG. 1.

Referring to FIG. 2, the administration server 100 includes a communication interface 110, a user interface 120, a storage unit 130, an administration unit 140, and a controller 150.

The communication interface 110 is connected to the plurality of image forming apparatuses 200-1, 200-2, 200-3, . . . , 200-n. More specifically, the communication interface 110 is designed to connect the administration server 100 to an external device and may have access to the plurality of image forming apparatuses 200-1, 200-2, 200-3, . . . , 200-n through not only a local area network (LAN) and an internet but also a universal serial bus (USB) port. In FIG. 1, the administration server 100 is directly connected to the plurality of image forming apparatuses 200-1, 200-2, 200-3, . . . , 200-n, but may be connected to them via another server or a router.

Furthermore, the communication interface 110 may transmit the "information regarding the other image forming apparatuses of the same group" (hereinafter, referred to as "group information") and the "generated quota information of each user" to the image forming apparatuses 200-1, 200-2, 200-3, . . . , 200-n. That is, the communication interface 110 may transmit the "generated quota information of each user" and the "group information" which are generated by the administration unit 140 to the respective image forming apparatuses 200-1, 200-2, 200-3, . . . , 200-n. According to an embodiment, the image forming apparatuses 200-1, 200-2, 200-3, . . . , 200-n share the quota information of each user with the other image forming apparatuses of the same group and thus the communication interface 110 may transmit the quota information of each user to only one image forming apparatus of each group.

The quota information, recited herein, may include information relating to authority for a user to perform a job using an image forming apparatus, and may include information regarding the number of copies to be printed, copied, faxed and scanned. The quota information may also include information about an amount of money that is allowed for a user.

The communication interface 110 may receive updated quota information of each user from the respective image forming apparatuses 200-1, 200-2, 200-3, . . . , 200-n. More specifically, the communication interface 110 may request the respective image forming apparatuses 200-1, 200-2, 200-3, . . . , 200-n to transmit quota information of each user currently stored in the image forming apparatuses 200-1, 200-2, 200-3, . . . , 200-n and receive the quota information of each user, or may receive quota information from the respective image forming apparatuses 200-1, 200-2, 200-3, . . . , 200-n at a predetermined time (12:00 PM every day or every 4 hours). Since communication is not performed between the administration server 100 and the image forming apparatuses 200-1, 200-2, 200-3, . . . , 200-n every time that the image forming apparatuses 200-1, 200-2, 200-3, . . . , 200-n perform a job, traffic load in a network can be reduced.

The user interface 120 may have a plurality of function keys through which diverse functions supported by the administration server 100 can be set or selected by a user, and may display diverse information provided by the administration server 100. The user interface 120 may be realized as a device performing input and output simultaneously such as a touch pad, or as a device combining a mouse and a monitor. An administrator may classify a plurality of image forming apparatuses connected to the administration server 100 into at least one group using a user interface (UI) window provided by the user interface 120. Also, an administrator may allocate users to the groups of image forming apparatuses using the UI window. Also, the administrator may allocate a quota to each user through the user interface 120.

The storage unit 130 may store the group information and the quota information of each user. More specifically, the storage unit 130 may store group information (for example, an IP address of an image forming apparatus of the same group) and quota information of each user which are set through the user interface 120 or the administration unit 140. Also, the storage unit 130 may store quota information (updated quota information) which is received from each image forming apparatus 200-1, 200-2, 200-3, . . . 200-4 through the communication interface 210. The storage unit 130 may be realized as an internal storage medium or an external storage medium of the administration server 100, for example, a removable disk including a USB memory or a web server connected via a network.

The administration unit 140 manages information regarding the plurality of image forming apparatuses 200-1, 200-2, 200-3, . . . , 200-n. More specifically, the administration unit 140 manages IP addresses or model names regarding the plurality of image forming apparatuses 200-1, 200-2, 200-3, . . . , 200-n connected to the administration server 100.

Also, the administration unit 140 may classify the plurality of image forming apparatuses 200-1, 200-2, 200-3, . . . , 200-n into at least one group based on the information regarding the plurality of image forming apparatuses 200-1, 200-2, 200-3, . . . , 200-n. More specifically, the administration unit 140 may group the plurality of image forming apparatuses 200-1, 200-2, 200-3, . . . , 200-n connected to the administration server 100 using a pre-set algorithm, based on the group information which is set through the user interface 120.

Furthermore, the administration unit 140 may generate quota information of each user corresponding to a classified image forming apparatus group. More specifically, the administration unit 140 may generate quota information of each user for each group using information input through the user interface 120 or a pre-set algorithm, and may manage the quota information of each user.

The controller 150 controls the respective components of the administration server 100. More specifically, if personal information and authority information of a user are received through the user interface 120, the controller 150 may control the administration unit 140 to generate quota information of each user. If a user inputs information regarding an image forming apparatus group he/she will use through the user interface 120, the controller 150 may control the administration unit 140 to generate quota information of each user which corresponds to the image forming apparatus group.

Also, the controller 150 may control the communication interface 110 to transmit the generated quota information of each user to an image forming apparatus of the corresponding group. If updated quota information is received from each image forming apparatus through the communication interface 110, the controller 150 may store the updated quota information in the storage unit 130.

In FIG. 2, the group information and the quota information of each user are set through the user interface 120. However, the group information and the quota information of each user may be set through a terminal device (not shown) connected to the administration server 100.

According to an embodiment as described above, since the administration server 100 groups the plurality of image forming apparatuses 200-1, 200-2, 200-3, . . . , 200-n and manages the quota information for each group, quota information can be managed more easily.

Figure 3:
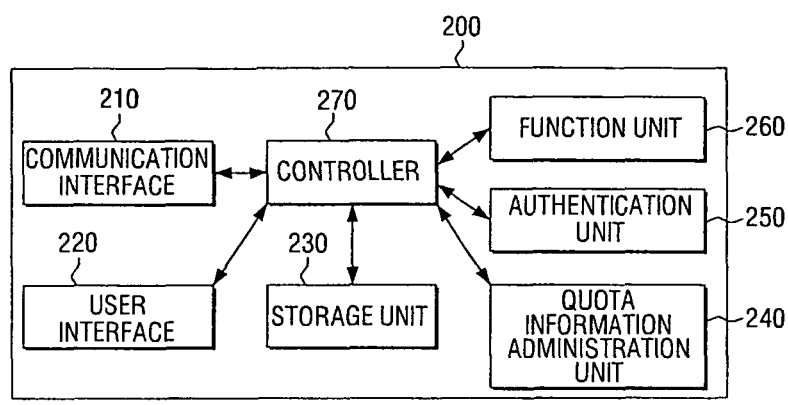
FIG. 3 is a block diagram illustrating the image forming apparatus of FIG. 1.

FIG. 3 is a block diagram illustrating an image forming apparatus 200 of FIG. 1. Referring to FIG. 3, the image forming apparatus 200 includes a communication interface 210, a user interface 220, a storage unit 230, a quota information administration unit 240, an authentication unit 250, a function unit 260, and a controller 270.

The communication interface 210 is designed to connect the image forming apparatus 200 to the administration server 100, and has access to the administration server 100 through at least one of a local area network (LAN), the Internet, and a universal serial bus (USB) port. Also, the communication interface 210 may be connected to the other image forming apparatuses of the same group and may be connected to a printing control terminal apparatus 10.

The communication interface 210 may receive information regarding the other image forming apparatuses of the same group and quota information of each user from the administration server 100. More specifically, the communication interface 210 may receive information regarding the other image forming apparatuses of the same group to which the image forming apparatus 200 belongs and quota information of each user of the corresponding group.

The communication interface 210 may receive quota information of each user from the other image forming apparatuses of the same group. More specifically, if a request for job execution is received, the communication interface 210 requests the image forming apparatuses of the same group to transmit quota information and receives the quota information from the other image forming apparatuses in response to the request, In another embodiment, the quota information may be received periodically without an extra request.

Figure 8:
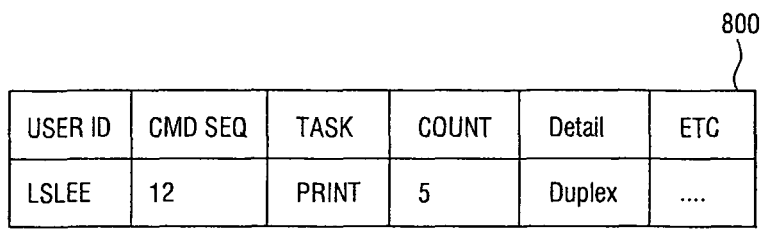
FIG. 8 is a view illustrating an example of updated information which is transmitted from an image forming apparatus to the other image forming apparatuses after performing a printing job.

The communication interface 210 may transmit updated quota information to the other image forming apparatuses of the same group. More specifically, if the quota information is changed after a job is performed, the communication interface 210 may transmit updated quota information to the other image forming apparatuses of the same group such that the updated quota information is applied to the other image forming apparatuses of the same group. Although only the updated quota information is transmitted to the other image forming apparatuses in one or more embodiments, information illustrated in FIG. 8 (details of a job performed in the image forming apparatus) may be transmitted to the other image forming apparatuses.

The communication interface 210 may transmit the quota information of each user to the administration server 100. More specifically, the communication interface 210 may transmit the quota information of each user which is stored in the image forming apparatus 200 to the administration server 100 at a predetermined time or at predetermined periods of time. In view of that the quota information of each user is shared in a group, the quota information may be transmitted from the administration server 100 to only a representative image forming apparatus of the group.

The communication interface 210 may be connected to the printing control terminal apparatus 10 and may receive a command to perform a job from the printing control terminal apparatus 10, which may have a universal serial bus (USB) port to receive a USB memory 20. More specifically, the communication interface 210 may receive a job command, such as to perform a scan job, a printing job, and a fax job, from the printing control terminal apparatus 10. The communication interface 210 may transmit a result of a requested job to the printing control terminal apparatus 10 which has transmitted a corresponding job command. If a job request from the printing control terminal apparatus 10 is not appropriate (for example, if a user who requests a printing job is not authenticated or if a quota allocated to a user is not sufficient to perform a corresponding job), the communication interface 210 may transmit an error message to the printing control terminal apparatus 10.

The user interface 220 may have a plurality of function keys through which a user can set or select diverse functions supported by the image forming apparatus 200, and may display diverse information provided by the image forming apparatus 200. The user interface 220 may be realized as a device performing input and output simultaneously such as a touch pad, or as a device combining an input device such as a mouse and a keyboard and a display device such as a cathode ray tube (CRT) monitor, a liquid crystal display (LCD) monitor, and a light emitting diode (LED) monitor.

The user interface 220 may receive a job command from a user. More specifically, the user interface 220 may display a user interface (UI) window to receive a job command from a user and may receive a job command through the UI window.

The user interface 220 may display a UI window to receive user information of a user who inputs a job command. Accordingly, the user may input user information to be authenticated through the UI window.

Also, if the job command is not appropriate, the user interface 220 may inform that the job cannot be performed. More specifically, if the number of copies required to perform a requested job is not determined to satisfy quota information of each user by the controller 270 or if a job command is input by a unauthorized user, the user interface 220 may inform that the job cannot be performed.

Figure 7:
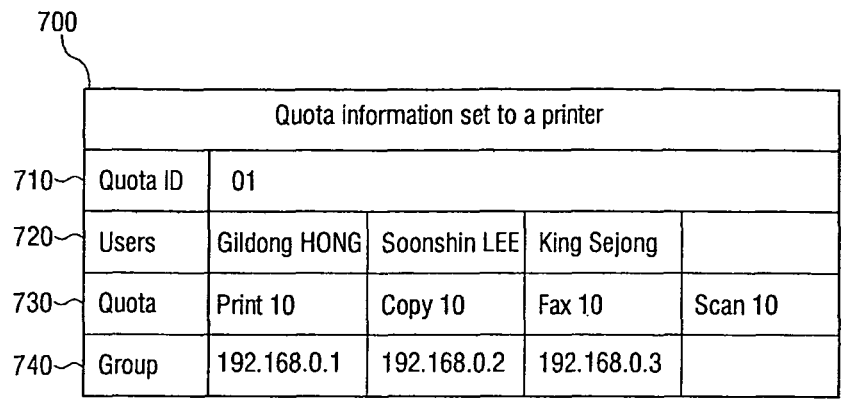
FIG. 7 is a view illustrating an example of quota information of each user stored in the storage unit of FIG. 2.

The storage unit 230 may store information regarding the other image forming apparatuses of the same group and quota information of each user which is shared with the other image forming apparatuses. More specifically, the storage unit 230 may store information regarding the other image forming apparatuses of the same group, which is received from the administration server 100 through the communication interface 210, and may store quota information of each user in a format of lookup table 700 including a 'quota ID' 710, a 'user' 720, a 'quota' 730, and a 'group' 740 as shown in FIG. 7.

The storage unit 230 may update the stored quota information. More specifically, the storage unit 230 may be controlled by the quota information administration unit 240 to update the stored quota information. The storage unit 230 may store a history of a job which is performed by the image forming apparatus 200.

The storage unit 230 may be realized as an internal storage medium and an external storage medium of the image forming apparatus 200, for example, a removable disk including a USB memory, a storage medium connected to a host, and a web server connected to a network.

The quota information administration unit 240 compares received quota information of each user with stored quota information of each user, thereby updating or maintaining the quota information. More specifically, in some situation, the image forming apparatus 200 may not be able to receive update information from the other image forming apparatuses (for example, if the image forming apparatus 200 is in a power-off state or if the image forming apparatus 200 receives update information with an error). Accordingly, the quota information administration unit 240 compares quota information received from the other image forming apparatuses with quota information stored in the storage unit 230 periodically or when receiving a job command, thereby updating or maintaining the quota information in the group.

The quota information administration unit 240 may update the quota information of the group to reflect a quota which is consumed as a job is performed. More specifically, the quota information administration unit 240 may update quota information stored in the storage unit 230 to reflect a quota which is consumed as a job is performed, and may control the communication interface 210 to transmit the updated quota information such that quota information stored in the other image forming apparatuses is updated.

The authentication unit 250 may perform authentication on a job command. More specifically, if a job command is received through the user interface 220, the authentication unit 250 may control the user interface 220 to display a UI window to authenticate a user. If authentication information is received from a user, the authentication unit 250 compares the input authentication information with pre-stored information to authenticate the user.

Also, if a job command is input from the printing control terminal apparatus 10 through the communication interface 210, the authentication unit 250 compares information regarding the printing control terminal apparatus 10, which has transmitted the job command, with pre-stored information to authenticate the printing control terminal apparatus 10.

The function unit 260 performs a function supported by the image forming apparatus 200 and may include an image forming unit to perform an image forming job, a scan unit to perform a scan job, and a fax unit to perform a fax job.

The controller 270 may control the respective components included in the image forming apparatus 200. More specifically, if information regarding the other image forming apparatuses of the same group and quota information of each user are received from the administration server 100 through the communication interface 210, the controller 270 may store the received information in the storage unit 230.

If a job command is input through the user interface 220 or the communication interface 210, the controller 270 may control the communication interface 210 to request the other image forming apparatuses of the same group to transmit quota information of each user. If the quota information of each user is received from the other image forming apparatuses in response to the request, the controller 270 may control the quota information administration unit 240 to determine whether the quota information of each user currently stored in the storage unit 230 is appropriate or not.

As a result, if the received quota information differs from the stored quota information, the controller 270 determines which quota information among the quota information of the group is latest quota information and controls the quota information administration unit 240 to update the quota information with the latest quota information.

Also, the controller 270 may determine whether to perform a job according to whether the number of copies requested by the job command satisfies the quota information of each user. For example, if a user is allowed to print only 10 copies but requests 20 copies, the controller 270 determines that the requested printing job cannot be performed. However, in another embodiment, it is determined that 10 copies are printed and the remaining 10 copies cannot be printed. In this case, the controller may determine whether to perform a job only when quota information is received from all other image forming apparatuses of the same group.

If the number of copies requested by the job command does not satisfy the quota information of each user, the controller 270 may control the user interface 220 to display a message informing that the job cannot be performed or control the communication interface 210 to transmit an error packet informing that the printing job cannot be performed to the printing control terminal apparatus 10 which has transmitted the job command.

The controller 270 may control the quota information administration unit 240 to update the quota information which is stored in the storage unit and the quota information which is stored in the other image forming apparatuses of the same group, as the job is performed. This operation may be performed before the requested job is performed or after the requested job is completed. However, if the job is performed after the quota information is updated, the controller 270 may further control the quota information administration unit 240 to update again the quota information stored in the storage unit and the quota information stored in the other image forming apparatuses of the same group in response to an error occurring during the printing operation (if a job cannot be performed due to an error such as "out of paper").

If the quota information of each user is updated, the controller 270 may transmit the updated quota information to the administration server 100. More specifically, the controller 270 may control the communication interface to transmit the updated quota information to the administration server 100 at a predetermined time (for example, at 12 p.m.) or at predetermined periods.

As described above, since the image forming apparatus 200 shares the quota information with the other image forming apparatuses of the same group and stores it, traffic load between the administration server 100 and the image forming apparatus 200 can be reduced. Also, since a user performs a job using his or her own quota without a separate setting for an image forming apparatus of the same group, user's convenience can be improved.

Figure 4:
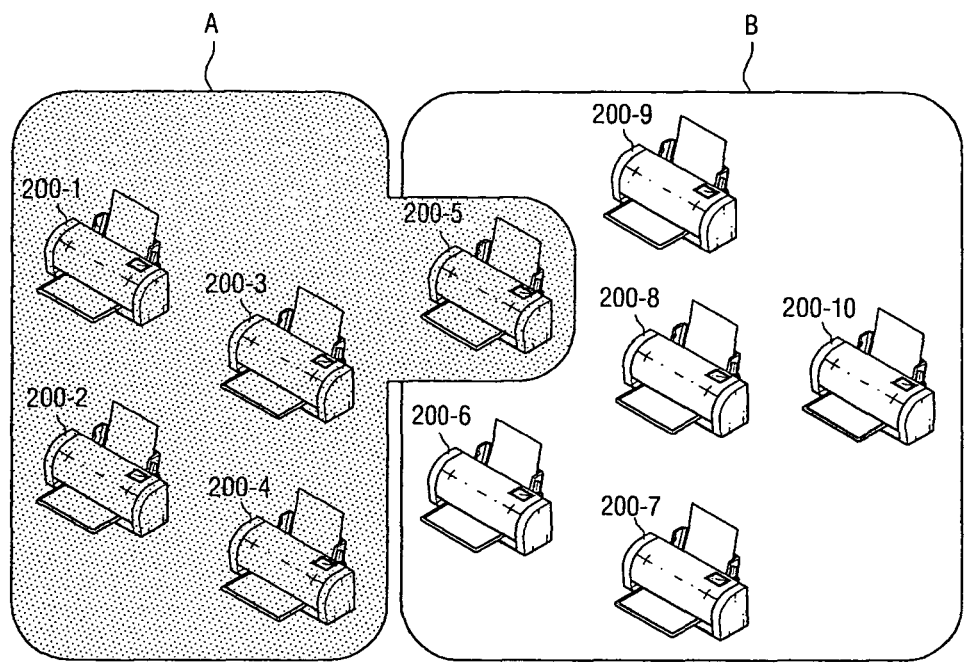
FIG. 4 is a view illustrating an example of grouping a plurality of image forming apparatus.

FIG. 4 is a view illustrating an example of grouping a plurality of image forming apparatuses.

Referring to FIG. 4, ten (10) image forming apparatuses 200-1 through 200-10 are grouped into two groups. For example, the image forming apparatuses of a group "A" (200-1 through 200-5) are located on the first floor, and the image forming apparatuses of a group "B" (200-6 through 200-10) are located on the second floor. Although all image forming apparatuses have the same configuration and function in FIG. 4, respective functions and appearances of the image forming apparatuses may be different. Also, the image forming apparatuses are grouped into two groups but they may be grouped into two or more groups.

In the explanation of FIGS. 1 to 4, the plurality of image forming apparatuses are grouped by a setting by a user or an administrator. However, the administration server 100 may automatically group the image forming apparatuses based on IP information or location information of the image forming apparatuses.

Figure 5:
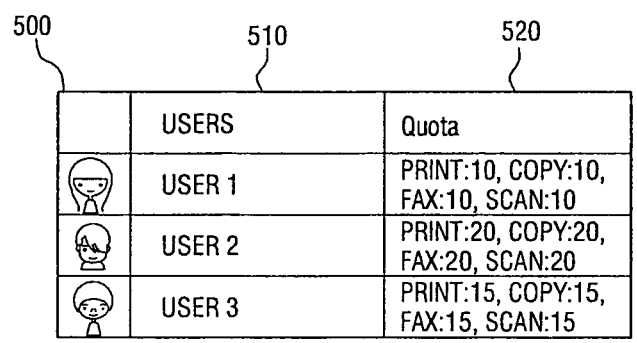
FIGS. 5 and 6 are views illustrating an example of transmitting quota information of each user which is stored in the administration server 100 to the groups of image forming apparatuses.
Figure 5:
Figure 5:
Figure 6:
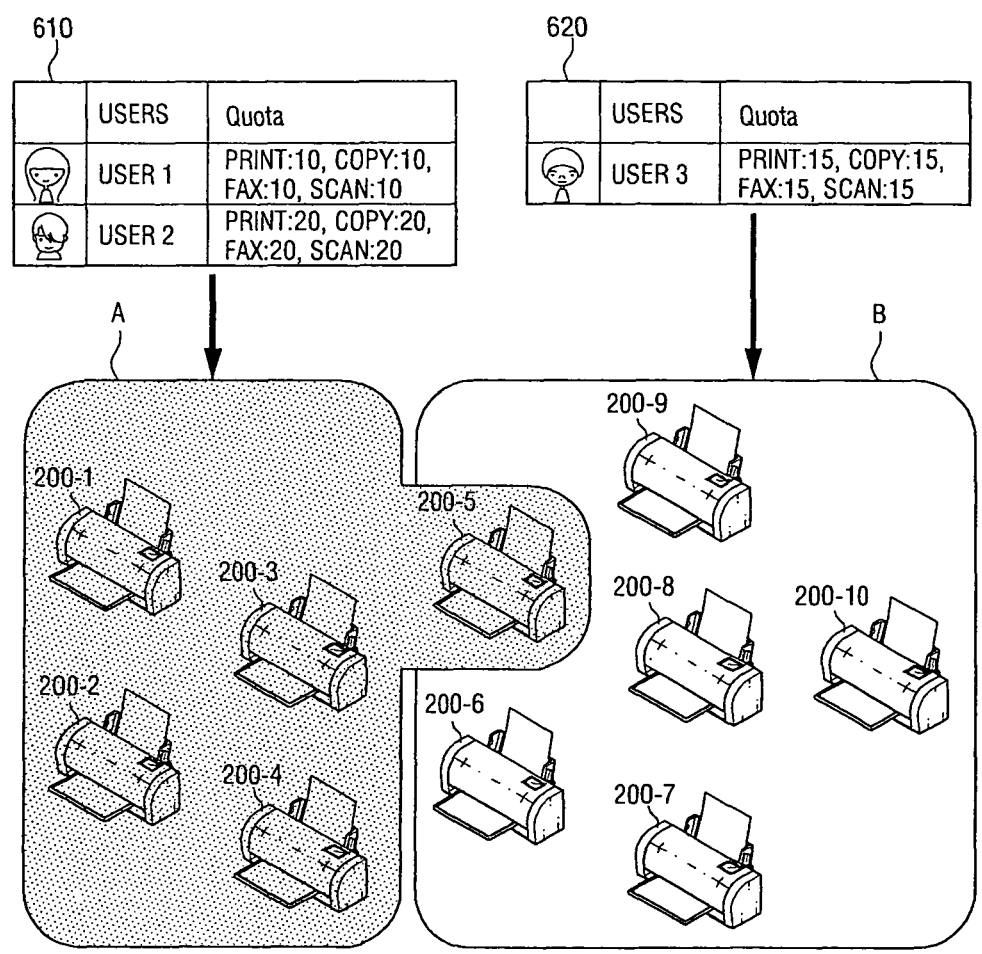

FIGS. 5 and 6 are views illustrating an example of transmitting quota information of each user stored in the administration server 100 to an image forming apparatus group.

Referring to FIG. 5, the administration server 100 stores quota information 520 of 3 users 510 as denoted in table 500. If users 1 and 2 are set to use one or more image forming apparatuses of the group "A" as denoted by reference numeral 610 and illustrated in FIG. 6 and a user 3 is set to use one or more image forming apparatuses of the group "B" as denoted by reference numeral 610 and illustrated in FIG. 6, the administration server 100 transmits quota information of the users 1 and 2 to the image forming apparatuses 200-1, 200-2, 200-3, 200-4, 200-5, and transmits quota information of the user 3 to the image forming apparatuses 200-6, 200-7, 200-8, 200-9, and 200-10.

FIG. 9 is a flowchart illustrating a method for generating quota information of each user by an administration server according to an embodiment.

Referring to FIG. 9, information regarding the plurality of image forming apparatuses 200-1, 200-2, 200-3, ..., 200-n is registered in the administration server 100. More specifically, the administration server 100 receives settings of image forming apparatuses (S910), and information regarding the respective image forming apparatuses may be registered in the administration server 100 (S920). Although several operations in FIG. 9 use the term printer, the operations of FIG. 9 apply to any image forming apparatus.

Quota information regarding all users may be generated. More specifically, users who will use the plurality of image forming apparatuses are set (registered) (S930), and information of respective users, for example, users' positions or departments are set (registered) (S940), such that quota information of each user may be generated (registered) (S950).

Quota information of each user to be transmitted to the respective image forming apparatus groups may be generated. More specifically, the maximum number of image forming apparatuses that can be used by one user is set (S960), an image forming apparatus to be used by the user is set (S970), an image forming apparatus group for each user is generated (S980), and quota information of each user to be transmitted to the generated image forming apparatus group may be generated.

The quota information may be transmitted to a corresponding image forming apparatus of a group (S990).

The method for generating quota information of each user of FIG. 9 may be executed by the administration server 100 having the configuration of FIG. 2 and may be executed by an administration server having any other configuration.

FIG. 10 is a flowchart illustrating a method for charging for printing by an image forming apparatus according to an embodiment.

If a job command is input by a user (S1005), it is determined whether the user who inputs the job command is an authorized user or not (S1010). This authenticating process may be performed at another stage.

If the job command is determined to be input by an authorized user, a request for quota information of the user is transmitted to the other image forming apparatuses of the same group (S1015). In response to the request, quota information of the corresponding user is received (S1020). Quota information regarding all users stored in the other image forming apparatuses of the same group may be requested and received. Also, in an embodiment, quota information is requested and received if a job command is input. However, in another embodiment, quota information may be received periodically. In this case, operations S1015 and S1020 may be omitted.

It is determined whether quota information is received from all image forming apparatuses of the same group or not (S1025). If the quota information is not received from some image forming apparatus, a request for quota information may be retransmitted to a corresponding image forming apparatus. Such an operation may be performed a predetermined number of times and, if quota information is not received although the request is transmitted a predetermined number of times, the printing job may be finished.

If quota information is received from all image forming apparatuses of the same group, it may be determined whether quota information is the same within the group (S1030). If the quota information is not the same within the group, the quota information may be updated with recent quota information or quota information shared by most image forming apparatuses (S1035).

If the quota information is the same within the group, it is determined whether it is possible to perform a requested job (S1040). For example, if 20 copies are requested to be printed but a printing quota allowed to the user is only 10 copies, it may be determined that it is impossible to perform the requested job.

If it is impossible to perform the requested job, a message indicating that the job cannot be performed may be displayed or an error packet may be transmitted to a terminal device which has transmitted the job command (S1065).

If it is possible to perform the requested job, the quota information of the same group is updated to represent that the quota is reduced as the job is performed (S1045). More specifically, the stored quota information is updated and the updated quota information may be transmitted to the other image forming apparatuses of the same group.

The requested job may be performed (S1050). If the requested job is normally performed (S1055), the printing job is completed, and if the requested job is not normally performed, the quota information may be updated such that the quota is restored to an original state (S1060).

According to the method for charging for printing, since the quota information is shared by the other image forming apparatuses of the same group, traffic load between the administration server 100 and the image forming apparatus 200 can be reduced. Also, since the user can perform the printing job using several image forming apparatuses of the same group using his or her own quota, user's convenience can be improved. The method of FIG. 10 may be executed by the image forming apparatus having the configuration of FIG. 3 and may be executed by an image forming apparatus having any other configuration.

Although a few embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. An image forming apparatus, comprising:
    a storage unit which stores information about other image forming apparatuses of the same group as the image forming apparatus and quota information of each user which is shared by the other image forming apparatuses;
    a controller which, if a job command is input, determines whether to perform a job according to whether a number of copies requested by the job command satisfies the quota information of each user;
    a function unit which performs the job under control of the controller; and
    a communication interface which transmits an updated quota information of each user stored in the storage unit as the job is performed to the other image forming apparatuses,
    wherein the storage unit receives the information about the other image forming apparatuses of the same group as the image forming apparatus and the quota information of each user which is shared with the other image forming apparatuses, from an administration server connected to the image forming apparatus, and stores the information, and
    wherein the communication interface transmits the updated quota information of each user to the administration server at a predetermined time.

2. The image forming apparatus as claimed in claim 1, wherein, if the job command is input, the communication interface requests the other image forming apparatuses to transmit quota information of a user who has input the job command, and receives the quota information.

3. The image forming apparatus as claimed in claim 2, wherein the controller compares the received quota information of the user with the quota information of each user stored in the storage unit, thereby updating or maintaining the quota information of each user.

4. The image forming apparatus as claimed in claim 2, wherein the controller determines whether to perform the job if quota information is received from all other image forming apparatuses of the same group.

5. The image forming apparatus as claimed in claim 1, further comprising an authentication unit which performs authentication of the job command,
wherein the controller determines whether to perform the job based only on authentication of a job command.

6. The image forming apparatus as claimed in claim 1, further comprising a user interface which displays a message indicating that the job cannot be performed if the number of copies requested by the job command does not satisfy the quota information of each user.

7. An image forming apparatus, comprising:
a storage unit which stores information about other image forming apparatuses of the same group as the image forming apparatus and quota information of each user which is shared by the other image forming apparatuses;
a controller which, if a job command is input, determines whether to perform a job according to whether a number of copies requested by the job command satisfies the quota information of each user;
a function unit which performs the job under control of the controller; and
a communication interface which transmits an updated quota information of each user stored in the storage unit as the job is performed to the other image forming apparatuses,
wherein the communication interface repeatedly transmits the updated quota information of each user to an image forming apparatus which has not received the updated quota information of each user.

8. A printing charging system, comprising:
a plurality of image forming apparatuses; and
an administration server which classifies the plurality of image forming apparatuses into at least one image forming apparatus group, and generates quota information of each user for each image forming apparatus group,
wherein each of the image forming apparatuses receives information about the other image forming apparatuses of the same group and the generated quota information of each user from the administration server, shares the received quota information with the other image forming apparatuses of the same group, and performs a job according to the shared quota information,
wherein each of the image forming apparatuses comprises:
a storage unit which stores the received quota information about the other image forming apparatuses of the same group and the received quota information of each user;
a communication interface which requests the other image forming apparatuses to transmit quota information of each user and receives the quota information of each user; and
a controller which compares the quota information received from the other image forming apparatuses with the quota information of each user stored in the storage unit, thereby updating or maintaining the quota information of each user.

9. The printing charging system as claimed in claim 8, wherein the controller which, if a job command is input, determines whether to perform a job according to whether a number of copies requested by the job command satisfies the quota information of each user; and
wherein each of the image forming apparatuses further comprises:
a function unit which performs the job under control of the controller.

10. The printing charging system as claimed in claim 9, wherein the controller updates the quota information of each user stored in the storage unit as the job is performed, and controls the communication interface to transmit the updated quota information of each user to the other image forming apparatuses.

11. A method for charging for printing of an image forming apparatus, the method comprising:
receiving information about the other image forming apparatuses of the same group as the image forming apparatus and quota information of each user which is shared with the other image forming apparatuses, from an administration server connected to the image forming apparatus;
storing the received quota information about the other image forming apparatuses and the quota information of each user; and
receiving a job command;
determining whether to perform a job according to whether a number of copies requested by the job command satisfies quota information of each user which is pre-stored in the image forming apparatus;
performing the job if the requested number of copies satisfies the quota information of each user;
transmitting an updated quota information of each user as the job is performed to the other image forming apparatuses; and
transmitting the updated quota information of each user to the administration server at a predetermined time.

12. The method as claimed in claim 11, further comprising, if the job command is input, requesting the other image forming apparatuses to transmit quota information about a user who has input the job command and receiving the quota information.

13. The method as claimed in claim 12, further comprising comparing the received quota information of the user with the quota information of each user stored in the storage unit, thereby updating the quota information of each user.

14. The method as claimed in claim 12, wherein the determining whether to perform the job is performed if quota information is received from all other image forming apparatuses of the same group.

15. The method as claimed in claim 11, further comprising performing authentication with respect to the job command,
wherein the determining whether to perform the job is performed with respect to only a job command which is authenticated.

16. The method as claimed in claim 11, further comprising informing that the job cannot be performed if the number of copies requested by the job command does not satisfy the quota information of each user.

17. A method for changing for printing of an image forming apparatus, the method comprising:
receiving a job command;
determining whether to perform a job according to whether a number of copies requested by the job command satisfies quota information of each user which is pre-stored in the image forming apparatus;
performing the job if the requested number of copies satisfies the quota information of each user; and
transmitting an updated quota information of each user as the job if performed to the other image forming apparatuses,
wherein the transmitting the updated quota information of each user repeatedly transmits the updated quota information of each user to an image forming apparatus which has not received the updated quota information of each user.

* * * * *

UNITED STATES PATENT AND TRADEMARK OFFICE
CERTIFICATE OF CORRECTION

| | | |
|---|---|---|
| PATENT NO. | : 8,823,966 B2 | Page 1 of 1 |
| APPLICATION NO. | : 12/923670 | |
| DATED | : September 2, 2014 | |
| INVENTOR(S) | : Lye-suk Lee et al. | |

It is certified that error appears in the above-identified patent and that said Letters Patent is hereby corrected as shown below:

In the Claims

Column 14, Line 14, in Claim 11, delete "apparatuses," and insert -- apparatus, --, therefor.
Column 14, Line 18, in Claim 11, delete "apparatuses" and insert -- apparatus --, therefor.
Column 14, Line 19, in Claim 11, after "user;" delete "and".
Column 14, Line 54, in Claim 17, delete "changing" and insert -- charging --, therefor.
Column 14, Line 64, in Claim 17, delete "if" and insert -- is --, therefor.

Signed and Sealed this
Fifteenth Day of September, 2015

Michelle K. Lee
*Director of the United States Patent and Trademark Office*